United States Patent
Sadowski et al.

(10) Patent No.: US 10,318,363 B2
(45) Date of Patent: Jun. 11, 2019

(54) SYSTEM AND METHOD FOR ENERGY REDUCTION BASED ON HISTORY OF RELIABILITY OF A SYSTEM

(71) Applicant: Advanced Micro Devices, Inc., Sunnyvale, CA (US)

(72) Inventors: Greg Sadowski, Cambridge, MA (US); Steven E. Raasch, Worcester, MA (US); Shomit N. Das, Austin, TX (US); Wayne Burleson, Shutesbury, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 202 days.

(21) Appl. No.: 15/338,172

(22) Filed: Oct. 28, 2016

(65) Prior Publication Data
US 2018/0121312 A1 May 3, 2018

(51) Int. Cl.
*G06F 11/00* (2006.01)
*G06F 11/30* (2006.01)
*G06F 11/34* (2006.01)

(52) U.S. Cl.
CPC ........ *G06F 11/008* (2013.01); *G06F 11/3058* (2013.01); *G06F 11/3452* (2013.01); *Y02D 10/34* (2018.01)

(58) Field of Classification Search
CPC .................................................. G06F 11/3495
See application file for complete search history.

(56) References Cited

U.S. PATENT DOCUMENTS

| | | | |
|---|---|---|---|
| 6,418,459 | B1 | 7/2002 | Gulick |
| 6,760,852 | B1 | 7/2004 | Gulick |
| 6,826,704 | B1 | 11/2004 | Pickett |
| 8,910,177 | B2 | 12/2014 | Osborn et al. |
| 9,153,502 | B2 * | 10/2015 | Hamaguchi ............. H01L 22/14 |
| 2006/0080062 | A1* | 4/2006 | Bose ...................... G06F 11/008 |
| | | | 702/186 |
| 2007/0208538 | A1 | 9/2007 | Gross et al. |
| 2011/0265090 | A1 | 10/2011 | Moyer et al. |

(Continued)

OTHER PUBLICATIONS

European Search Report in European Application No. 16203675.0, dated Jun. 21, 2017, 4 pages.

(Continued)

*Primary Examiner* — Christopher S McCarthy
(74) *Attorney, Agent, or Firm* — Meyertons Hood Kivlin Kowert and Goetzel PC; Rory D. Rankin

(57) ABSTRACT

A system and method for managing operating parameters within a system for optimal power and reliability are described. A device includes a functional unit and a corresponding reliability evaluator. The functional unit provides reliability information to one or more reliability monitors, which translate the information to reliability values. The reliability evaluator determines an overall reliability level for the system based on the reliability values. The reliability monitor compares the actual usage values and the expected usage values. When system has maintained a relatively high level of reliability for a given time interval, the reliability evaluator sends an indication to update operating parameters to reduce reliability of the system, which also reduces power consumption for the system.

18 Claims, 6 Drawing Sheets

(56) References Cited

U.S. PATENT DOCUMENTS

| | | | |
|---|---|---|---|
| 2011/0271141 A1* | 11/2011 | Kursun | G06F 11/008 |
| | | | 714/6.3 |
| 2012/0007663 A1 | 1/2012 | Ricca et al. | |
| 2013/0054179 A1* | 2/2013 | Shapira | G06F 11/3024 |
| | | | 702/117 |
| 2013/0326269 A1 | 12/2013 | Losh et al. | |
| 2013/0346774 A1 | 12/2013 | Bhandaru et al. | |
| 2014/0068298 A1 | 3/2014 | Simeral | |
| 2014/0107822 A1* | 4/2014 | Chadwick | G01R 31/2872 |
| | | | 700/95 |
| 2014/0306837 A1 | 10/2014 | Hauck, III | |
| 2014/0375658 A1 | 12/2014 | Lichmanov et al. | |
| 2015/0377955 A1 | 12/2015 | Shapira et al. | |
| 2016/0070321 A1* | 3/2016 | Shapira | G06F 1/26 |
| | | | 713/300 |
| 2016/0154687 A1* | 6/2016 | Shan | G06F 11/008 |
| | | | 714/763 |
| 2016/0378168 A1 | 12/2016 | Branover et al. | |
| 2017/0371719 A1 | 12/2017 | Majumdar et al. | |
| 2018/0067535 A1 | 3/2018 | Kosonocky et al. | |

OTHER PUBLICATIONS

Communication pursuant to Article 94(3) in European Application No. 16203675.0, dated Aug. 8, 2017, 7 pages.
Communication pursuant to Article 94(3) in European Application No. 16203675.0, dated Feb. 16, 2018, 9 pages.

* cited by examiner

SYSTEM AND METHOD FOR ENERGY REDUCTION BASED ON HISTORY OF RELIABILITY OF A SYSTEM

This invention described herein was made with Government support under Prime Contract Number DE-AC02-05CH11231, Fixed Price Subcontract Number 7216338 awarded by the United States Department of Energy. The United States Government has certain rights in this invention.

BACKGROUND

Description of the Relevant Art

Computing systems include many components. Such computing systems may be devices such as smartphones, audio/video receivers, and so forth. Computing systems also include multiple devices interconnected with one another, such as a desktop computer connected to one or more peripherals, or a multi-node cluster connected via a network. The computing systems further include integrated circuits which control other components such as motors, throttles, hydraulics, robotic arms, and so forth. For example, the computing systems are also included in embedded systems such as electronic control units (ECUs) in automotive electronics, control units for factory line robots, household appliances, and so on.

In order to satisfy the needs of a user of a given computing system, a given level of reliability of the system is provided by the manufacturer of the system. The reliability of a system is measured in a variety of ways. Common measures of reliability include time between system failures (crashes), time between detected errors in data, time between exceptions or error codes being generated, time between failures on an assembly line for a robot, time between a throttle being incorrectly set that causes engine efficiency to decrease, and so forth. In order to maintain a particular level of reliability, designers may include components and use techniques to prevent or reduce errors.

While maintaining a high degree of reliability is desirable, maintaining such reliability is not without cost. Generally speaking, maintaining a higher degree of reliability consumes more power. As the system designers may not know what conditions a system may be operating under when finally deployed, they may assume worst case scenario conditions when designing the reliability mechanisms. Unfortunately, such an approach often results in a system that is over-designed, may be more reliable than actually needed by a customer, and consumes more power than necessary.

In view of the above, efficient methods and systems for managing operating parameters within a device for optimal power and performance while meeting a reliability level are desired.

Figure 1:
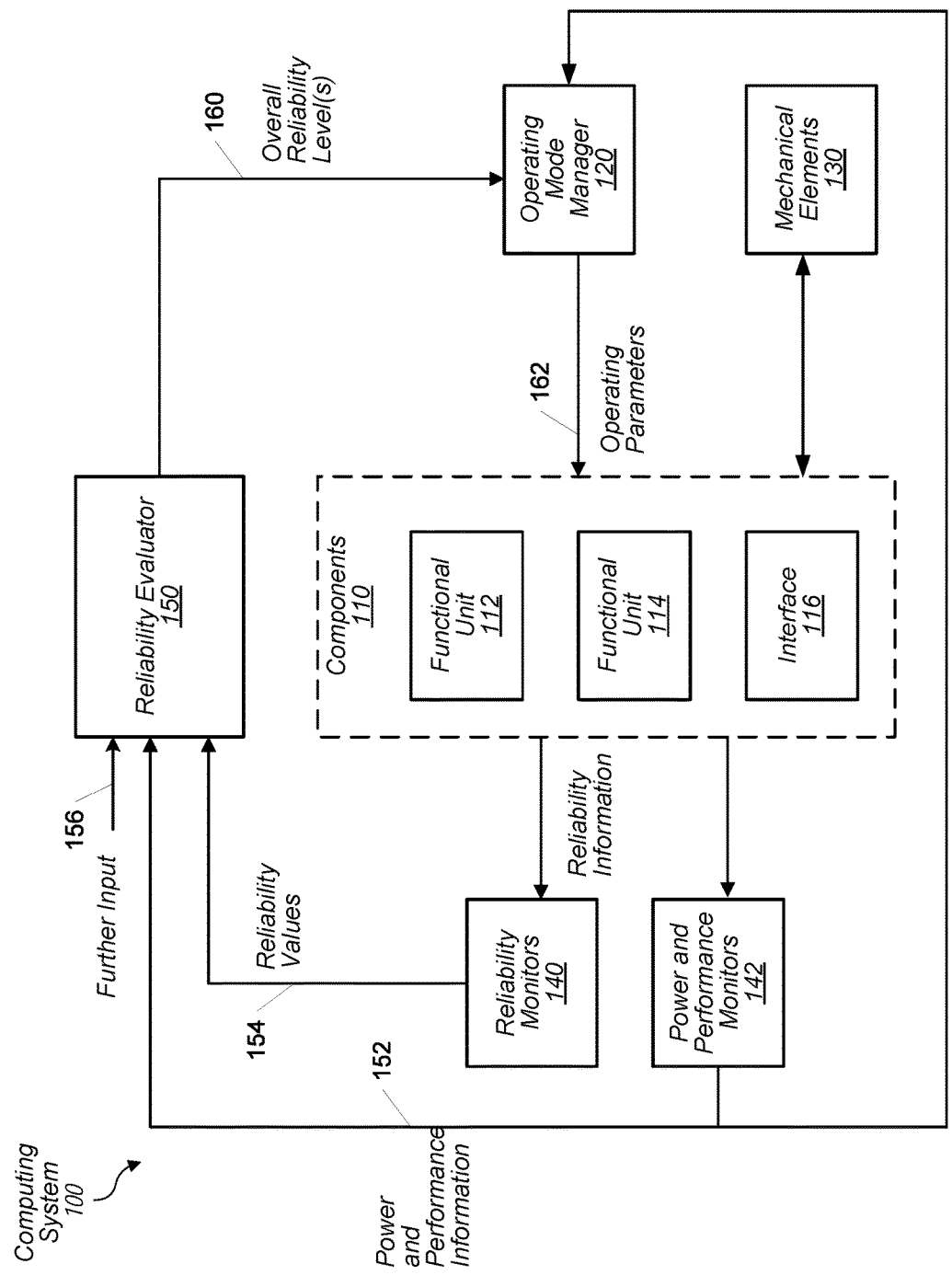
FIG. 1 is a generalized diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for managing operating parameters within a system for optimal power and reliability are contemplated. In various embodiments, a semiconductor chip includes one or more functional units each of which operates with respective operating parameters. One or more functional units are connected to a corresponding reliability monitor. The reliability monitor collects reliability information during a given time interval and translates it into reliability values. The reliability information includes any of a variety of information regarding the reliability of the system. Examples include a number of parity errors, a number of detected error and correction actions for data, one or more measured temperature values, a number of dropped packets at an I/O interface due to the incoming traffic is too great, a precision level for numerical results being produced, a number of times an error code or an exception is generated, a number of failures on an assembly line for a robot, and so forth. A reliability evaluator receives the reliability values, generates an overall reliability level and sends an indication based on the overall reliability level to an operating mode manager to update one or more operating parameters. A variety of algorithms determining both the overall reliability and the operating parameter updates are used by the reliability evaluator and the operating mode manager, which implement the algorithms in hardware circuitry, software, or a combination. The algorithms include decisions made by definitions provided by developers, by self-learning definitions, or a combination. In some embodiments, machine-learning may be used to allow the device to adjust the reliability parameters based on the incoming reliability metrics.

The reliability evaluator determines from the reliability values gathered during another time interval whether the computing system has maintained a given (e.g., relatively high) level of reliability that exceeds some threshold. In some embodiments, this time interval is the same as the given time interval used for collecting reliability values. In other embodiments, this time interval is different from the earlier given time interval for collecting reliability values. If the given level of reliability has been maintained, the reliability evaluator updates operating parameters to include values which reduce reliability for one or more functional units. The reliability evaluator also determines from the reliability information whether the semiconductor chip has provided a level of reliability approaching a minimum reliability level. If so, the reliability evaluator updates operating parameters to include values which increase the reliability of one or more functional units. In this manner, the semiconductor chip maintains a reliability level above the minimum level while also reducing power consumption when the reliability level exceeds an upper threshold for a given time period.

When controlling mechanical components, the computing system may be an embedded system such as electronic control units (ECUs) in automotive electronics, transmission control units that control modern automatic transmissions, robots on assembly lines, household appliances, and so on. The computing system includes logic, such as the above reliability evaluator, for implementing algorithms for selecting operating parameters. The logic is implemented in hardware, software, or a combination. The selected operating parameters determine a relative amount of power consumed, a level of performance achieved, and a level of reliability maintained. The reliability of the computing system refers to the ability of the computing system to produce similar desirable results over time. These similar results are similar in the sense that a given number of errors, which are preferably a relatively low number, are produced over time.

Turning to FIG. 1, a generalized block diagram of one embodiment of a computing system 100 is shown. As shown, the computing system 100 includes components 110, an operating mode manager 120, reliability monitors 140, power and performance monitors 142 and reliability evaluator 150. In various embodiments, the computing system 100 also includes mechanical elements 130. In other embodiments, the computing system 100 does not include mechanical elements 130. The components 110 includes functional units 112-114 in addition to the interface 116. Although two functional units are shown, in various embodiments, any number of functional units are included in the components 110. Similarly, although a single interface 116 is shown, in various embodiments, the components 110 include any number of interfaces.

In various embodiments, each of the functional units 112-114 is representative of any circuitry with its own voltage/clock domain. In some embodiments, each of the functional units 112-114 is representative of a processing unit, a general-purpose central processing unit (CPU) complex, a graphics processing unit (GPU), or another processor such as a digital signal processing (DSP) cores, a field programmable gate arrays (FPGA), an application specific integrated circuits (ASIC), and so forth. A single voltage/clock domain is discussed here for ease of illustration. In some embodiments, the reliability monitors 140 includes a corresponding monitor for each voltage/clock domain. In other embodiments, the reliability monitors 140 is used for multiple voltage/clock domains, and maintains a given voltage/clock domain based on an identifier of a source for the reliability information. In some embodiments, the reliability monitors 140 includes a corresponding monitor for each type of reliability information.

In some embodiments, the interface 116 also has its own voltage/clock domain. In other embodiments, the interface 116 shares a voltage/clock domain with one of the functional units 112-114. Each of the functional units 112-114 and the interface 116 convey reliability information to the reliability monitors 140. In various embodiments, the functional units 112-114 and the interface 116 convey reliability information after detecting a given time interval has elapsed. In other embodiments, the functional units 112-114 and the interface 116 convey reliability information when polled by the reliability monitors 140.

In various embodiments, the reliability monitors 140 translate the reliability information to reliability values. For example, the reliability monitors 140 receive a number of parity errors from the functional unit 112 and translate the number to a reliability value for the functional unit 112. In various embodiments, the reliability value is a normalized value. In some embodiments, two or more translated reliability values are combined to generate another reliability value to use later for generating a reliability level. In various embodiments, the reliability information includes any of a variety of information regarding the reliability of at least the components 110 and the mechanical elements 130. As described earlier, the reliability of the computing system 100 refers to the ability of the computing system 100 to produce similar results over time. The similar results are directed at a minimum number of errors produced over time.

Examples of the reliability information sent to the reliability monitors 140 include a number of parity errors, a number of detected error and correction actions for data, one or more temperature values from sensors on or near the functional units 112-114 and the interface 116, a number of dropped packets at the interface 116 due to the incoming traffic is too great, a precision level for numerical results produced by the functional units 112-114, a number of times an error code or an exception is used, and so forth. In some embodiments, the reliability monitors 140 send the reliability information "as-is" to the reliability evaluator 150. In other embodiments, the reliability monitors 140 translate the reliability information to reliability values as described earlier.

In addition to the reliability values from the reliability monitors 140, in some embodiments, the reliability evaluator 150 receives further input 156 for generating the one or more reliability levels. The further input 156 is information from the mechanical elements 130 if they are used. In various embodiments, the mechanical elements 130 include one or more of motors, throttles, hydraulics, robotic arms, gears of a transmission, and so forth. In some embodiments, the further input 156 includes a power level or use level for the mechanical elements 130 (e.g., high use or high power, low use or low power). In some embodiments, the further input 156 also includes a number of mishaps such as a number of times a robotic vacuum cleaner does not return to its docking station, a number of times a robotic arm fails to perform a procedure on an assembly line, a number of times a throttle is not set correctly to allow for a given engine efficiency to be achieved, a number of times a transmission waits too long or actually does not shift gears when requested, and so forth.

In various embodiments, the above reliability information from the mechanical elements 130 is sent to the reliability evaluator 150 through the components 110 and the reliability monitors 140. In other embodiments, the reliability information is sent directly to the reliability evaluator through the further input 156. In various embodiments, the further input 156 also includes feedback from other applications running on other systems. A particular application programming interface (API) is used to provide the feedback information. Alternatively, this feedback information is sent to the interface 116, which sends reliability information to the reliability monitors 140. The feedback includes customer feedback such as particular complaints, no complaints or praise for an achieved reliability level. In some embodiments, the further input 156 also includes a system crash history, information regarding cosmic and environmental radiation levels monitored by canary circuits and a temperature history from one or more temperature sensors located away from the components 130. Again, it is possible this information is received from the interface 116 or one of the functional units 112-114 through the reliability monitors 140.

Based on the reliability values 154 received from the reliability monitors 140 and information from the further input 156, the reliability evaluator 150 generates one or more overall reliability levels 160. In various embodiments, the one or more overall reliability levels 160 include a weighted contribution from each of the reliability values 154 and other received information. The operating mode manager 120 uses the one or more reliability levels 160 for generating the updated operating parameters 162.

When the reliability evaluator 150 determines the one or more generated reliability levels exceed an upper threshold, the reliability evaluator 150 generates information (or an indication) to decrease reliability for the components 110 and possibly the mechanical elements 130. The information includes one or more of commands, indications or flags, computed values, and/or otherwise that are used to adjust operational parameters for the components 110. The information indicates the reliability of the components 110 and possibly the mechanical elements 130 is to be reduced from a current corresponding reliability.

The information sent from the reliability evaluator 150 to the operating mode manager 120 indicates using a lowered operational voltage for the components 110, using lowered precision for compute blocks within the functional units 112-114, disabling given compute blocks within the functional units 112-114, and using more lossy data compression than currently being used in the components 110. In some embodiments, the information sent from the reliability evaluator 150 also indicates using a speculative communication protocol in the interface 116 through decoupling acknowledgment from requests, reducing power to a motor within the mechanical elements 130, and using parity checking rather than using error detection and correction techniques in the components 110. The information sent from the reliability evaluator 150 indicates any of a variety of methods and techniques for reducing reliability of the computing system 100, which also reduces the power consumption of the computing system 100.

The reliability evaluator 150 also determines from the reliability information whether the computing system 100 after being directed to lower reliability has provided a descending level of reliability approaching the minimum reliability level. If so, the reliability evaluator 150 sends information to the operating mode manager 120 indicating updates to the operating parameters to include values which increase reliability for one or more of the components 110 and the mechanical elements 130. Therefore, the computing system 100 maintains a reliability level above the minimum level while also reducing power consumption when the reliability level exceeds an upper threshold for a given time period.

In some embodiments, the reliability evaluator 150 also receives power and performance information 152 from the power and performance monitors 142. This information includes a power-performance state for the functional units 112-114 and the interface 116, one or more sensor-measured temperature values, an activity level measured over time or based on scheduling currently occurring by the operating system, and so on. Therefore, the reliability evaluator 150 is able to generate information indicating recommended selections by the operating mode manager 120 for the operating parameters 162 for the components 110. In other embodiments, the operating mode manager 120 generates the updated operating parameters 162. In other embodiments, the reliability evaluator 150 does not receive the power and performance information 152. Rather, the operating mode manager 120 receives this information.

Figure 2:
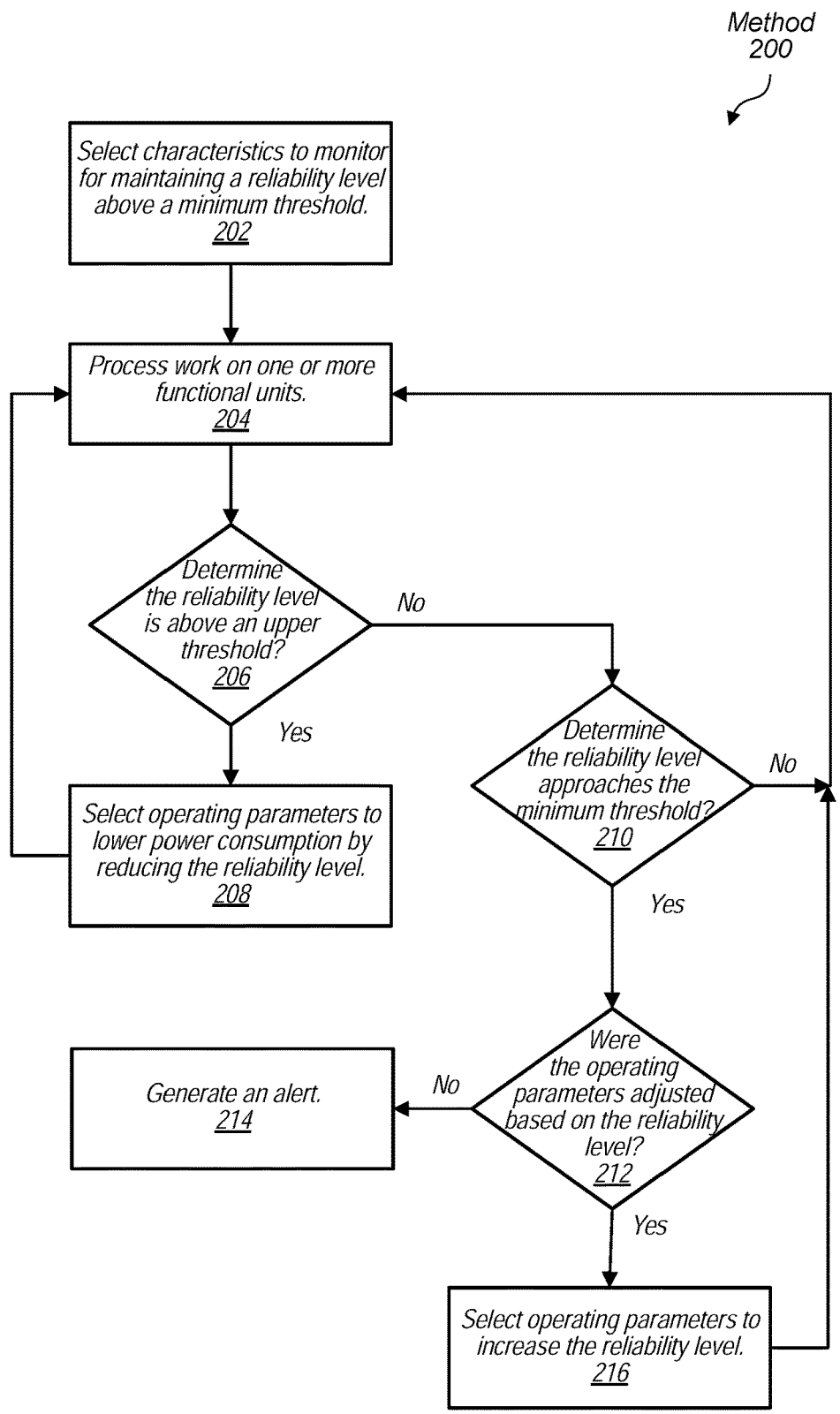
FIG. 2 is a generalized diagram of one embodiment of a method for managing power and reliability of a computing system.

Referring now to FIG. 2, one embodiment of a method 200 for managing power and reliability of a computing system is shown. For purposes of discussion, the steps in this embodiment (as well as in FIG. 6) are shown in sequential order. However, in other embodiments some steps occur in a different order than shown, some steps are performed concurrently, some steps are combined with other steps, and some steps are absent.

Characteristics are selected to monitor (block 202). The monitored characteristics are used for maintaining a reliability level of a system above a minimum threshold. For integrated circuits, the characteristics include an operational voltage, an operational clock frequency, a given level of precision for numerical results, one or more temperature values to be compared to sensor-measured temperatures, an indication of age, an indication of cosmic and environmental radiation levels, a number of times an error code or an exception is used, and so forth.

For memory, network or other input/output (I/O) interfaces, the characteristics include a number of dropped packets, an indication of using acknowledgment with requests, a number of parity errors, a number of detected error and correction actions for data, an indication of bandwidth to receive and output and so forth. For embedded systems with controllers of mechanical elements, such as motors and engines and robotic parts, the characteristics include a speed of a motor, a number of mishaps such as a number of times a robotic vacuum cleaner does not return to its docking station or a number of times a robotic arm fails to perform a procedure on an assembly line, a number of times a throttle is not set correctly to allow for a given engine efficiency to be achieved, a number of times a transmission waits too long or actually does not shift gears when requested, and so forth.

A workload is processed by one or more functional units (block 204). Such a workload generally entails execution of software applications, operating system processes, or other processes. The one or more functional units processing the software applications are within a processor, a processing unit, an embedded processor, a CPU complex, a GPU, a SOC, or other.

A reliability level for the system is generated and maintained during processing of the workload. The reliability level is based on the reliability information corresponding to the selected characteristics. In various embodiments, an overall reliability level includes a weighted contribution from each of the monitored characteristics. The overall reliability level is compared to one or more thresholds, such as a minimum reliability threshold and an upper reliability threshold.

When the reliability level is above an upper threshold ("yes" branch of the conditional block 206), operating parameters are selected to lower power consumption by reducing the reliability level (block 208). In some embodiments, the reliability level is above the upper threshold for a given time interval before selecting the operating parameters. In other embodiments, no time interval is used. As described earlier regarding the computing system 100 in FIG. 1, the selected operating parameters include a lowered operational voltage, lowered precision for compute blocks within the one or more functional units, disabling given compute blocks within the one or more functional units 112-114, using more lossy data compression than currently being used, and so forth. The selection of the operating parameters indicates any of a variety of methods and techniques for reducing reliability of the system, which also reduce the power consumption of the system.

When the reliability level is below the upper threshold ("no" branch of the conditional block 206), and the reliability level is not determined to approach the minimum threshold ("no" branch of the conditional block 210), the control flow of method 200 returns to block 204 where a workload is processed by the one or more functional units in a system. However, when the reliability level is below the upper threshold ("no" branch of the conditional block 206), and the reliability level is determined to approach the minimum threshold ("yes" branch of the conditional block 210), the declining reliability level is due to an earlier adjustment based on the reliability level or due to the system simply experiencing degraded reliability.

If the operating parameters were not adjusted based on the reliability level ("no" branch of the conditional block 212), then an alert is generated (block 214). The alert is one or more of an indication such as an error code, a blinking light emitting diode (LED), a popup window with a message, a generated interrupt or exception, or any variety of methods for alerting a user or administrator of a degrading reliability of the system. If the operating parameters were previously adjusted based on the reliability level ("yes" branch of the conditional block 212), then operating parameters are selected to increase the reliability level (block 216). The operating parameters to update include the earlier examples of the operating parameters affecting the reliability of the system. Control flow of method 200 then returns to block 204 where a workload is processed by the one or more functional units in a system. By adjusting the operating parameters to increase or decrease the reliability, power consumption is reduced during time periods of relatively high reliability.

Figure 3:
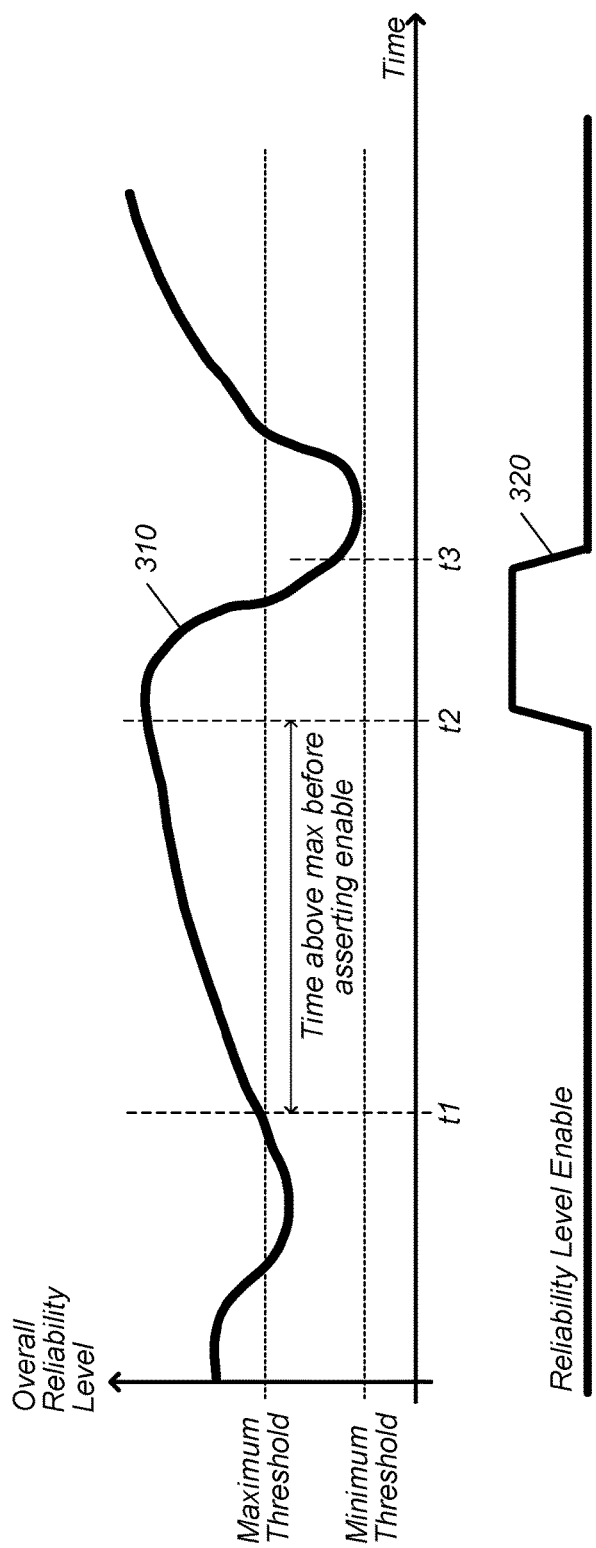
FIG. 3 is a generalized diagram of one embodiment of graph showing a reliability of a computing system.

Turning now to FIG. 3, a graph depicting reliability levels is shown. In the illustrated embodiment, an overall reliability level 310 is shown changing over time. Each of a maximum threshold and a minimum threshold are also shown. These thresholds are used to determine whether to send an indication to an operating mode manager to update operating parameters in a certain manner.

When the overall reliability level 310 exceeds the maximum threshold at time t1, a timer begins to measure how long the overall reliability level 310 is above the maximum threshold. When the time reaches time t2, a duration threshold has been reached. When the duration reaches this threshold, an indication is sent to the operating mode manager to update operating parameters to reduce reliability for the system, which also reduces power consumption.

In various embodiments, the indication sent from the reliability evaluator to the operating mode manager includes one or more of commands, flags, computed values, and/or otherwise that are used to indicate how to adjust operational parameters for the system. Examples of the updated operating parameters include a lowered operational voltage, a lowered precision for compute blocks within functional units, disabling given compute blocks within the functional units, using more lossy data compression than currently being used, load value approximation used to estimate requested memory values when a cache miss occurs, and so on as described earlier.

In various embodiments, the reliability enable signal 320 is asserted as a result of the duration threshold being reached. As the operating mode manager adjusts the operating parameters to reduce reliability, the overall reliability level descends toward the minimum threshold. In various embodiments, another threshold (not shown) is used to react prior to the minimum threshold being reached. For example, at time t3, the reliability evaluator sends information to the operating mode manager indicating updates to the operating parameters to include values which increase reliability for the system. The reliability enable signal used for decreasing the reliability level is deasserted at time t3. Therefore, the system maintains an overall reliability level above the minimum threshold while also reducing power consumption when the overall reliability level exceeds an upper threshold, such as the maximum threshold.

Figure 4:
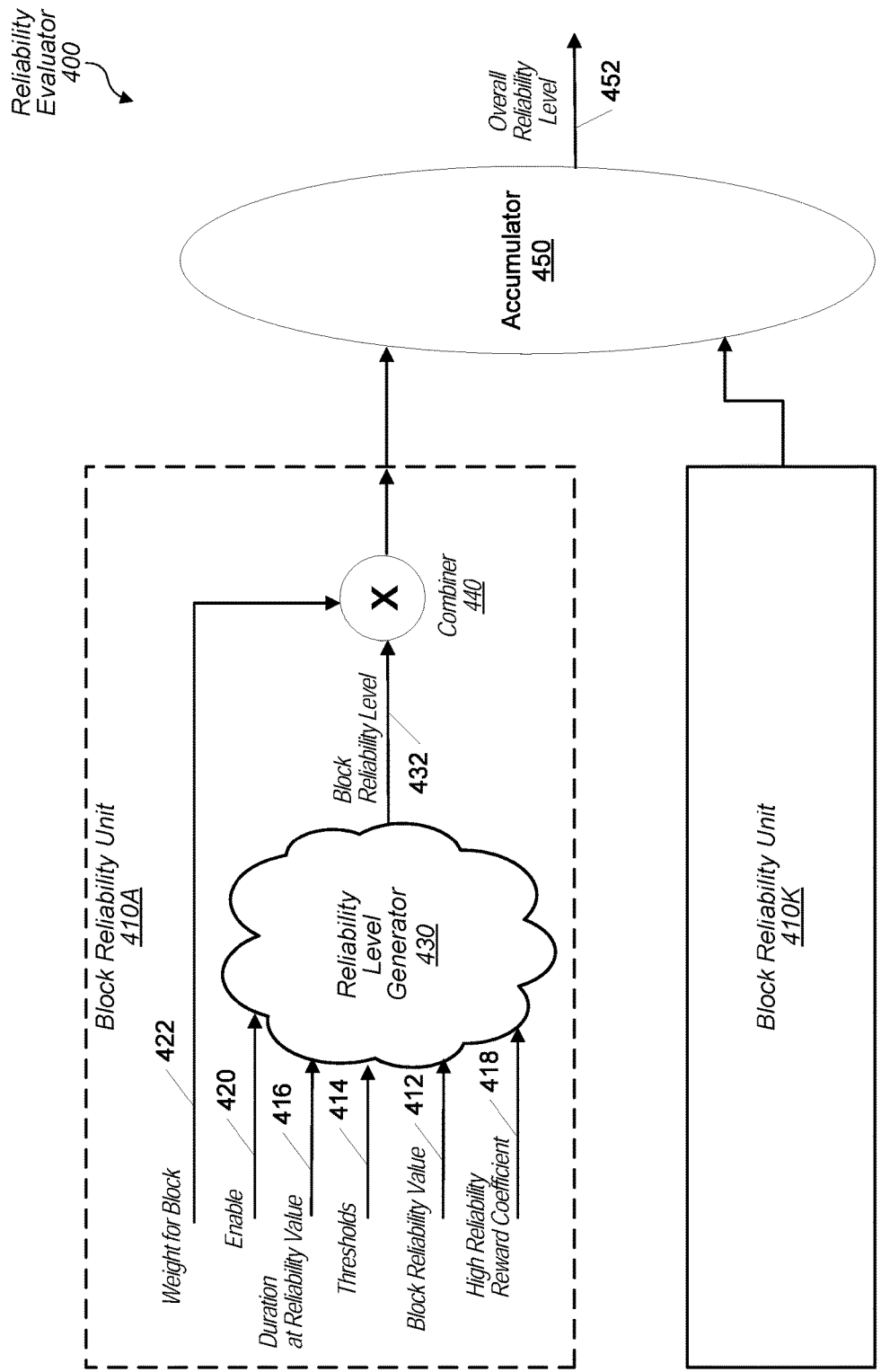
FIG. 4 is a generalized diagram of one embodiment of a reliability evaluator.

Referring now to FIG. 4, a generalized block diagram of one embodiment of a reliability evaluator 400 is shown. In the illustrated embodiment, the reliability evaluator 400 includes multiple block reliability units 410A-410K and an accumulator 450. Each of the block reliability units 410A-410K corresponds to a given functional unit, I/O interface, mechanical component, or other.

As shown, the block reliability unit 410A receives multiple inputs. One input is a block reliability value 412. As described earlier, the block reliability value 412 is a value previously translated from a measurement. In some embodiments, a number of parity errors from a given functional unit is compared to thresholds for parity errors in a given time period. Based on at least the comparisons, the number of parity errors is translated to a reliability value which indicates a relatively low, medium or high reliability regarding retrieving data in the given functional unit or I/O interface. In some embodiments, the reliability value is a normalized value. If the block reliability value 412 was generated based on comparisons with thresholds, then the minimum and maximum thresholds 414 are not used. However, in other embodiments, the thresholds 414 are still used as they are programmable to different values based on conditions and are different thresholds than the thresholds used to generate the block reliability value 412.

A duration 416 for the block reliability value 412 to have its current value is also received by the reliability level generator 430. Alternatively, the duration 416 is a time interval since a last time a block reliability level 432 was generated. When the block reliability value 412 is above an upper threshold of the thresholds 414, a high reliability reward coefficient 418 is used to generate the block reliability level 432.

In some embodiments, an intermediate value is selected based on the comparisons of the block reliability value 412 and the thresholds 414. A first intermediate value is selected when the block reliability value 412 is below a lower threshold of the thresholds 414. A second intermediate value is selected when the block reliability value 412 is between the lower threshold and an upper threshold of the thresholds 414.

A third intermediate value is selected when the block reliability value 412 is above the upper threshold. Additionally, the third intermediate value is combined with the high reliability reward coefficient 418. In various embodiments, the combination uses multiplication, a weighted sum or other method for combining the values. To produce the block reliability level 432, the duration 416 is combined with the selected intermediate value. In various embodiments, other inputs not shown are also received by the reliability level generator 430 and used to generate the block reliability level 432.

The block reliability level 432 is combined with a weight 422 for the block by the combiner 440. The combination is multiplication or other means of combining the values. The accumulator 450 sums the weighted block reliability levels from the block reliability units 410A-410K. The sum provides the overall reliability level 452.

In some embodiments, the weight 422 used by the block reliability unit 410A is specific to the corresponding block, functional unit, I/O interface or mechanical component. In various embodiments, each of the block reliability units 410A-410K uses different values for the weight 422. In some embodiments, the weights are selected through a calibration process and the weights for the block reliability units 410A-410K are selected to provide a normalized value for the overall reliability level 452. For example, in various embodiments, the overall reliability level 452 is normalized to be between 0 and 100. Other ranges are possible and contemplated. In some embodiments, at least the thresholds 414, the duration 416 and the weight 422 are programmable values and changed over time.

In some embodiments, the reliability level generator 430 receives an enable signal 420. In other embodiments, the combiner 440 or the accumulator 450 receives an enable signal 420 to qualify generating an updated value for the overall reliability level 452. In some embodiments, the enable signal 420 is asserted after a given time interval has elapsed. Alternatively or in combination, the enable signal 420 is asserted responsive to a user command, program code, or the detection of some event. In some embodiments, one or more generated or received values are stored to support using a history. A history of past values is combined with current values to generate the overall reliability level 452.

Figure 5:
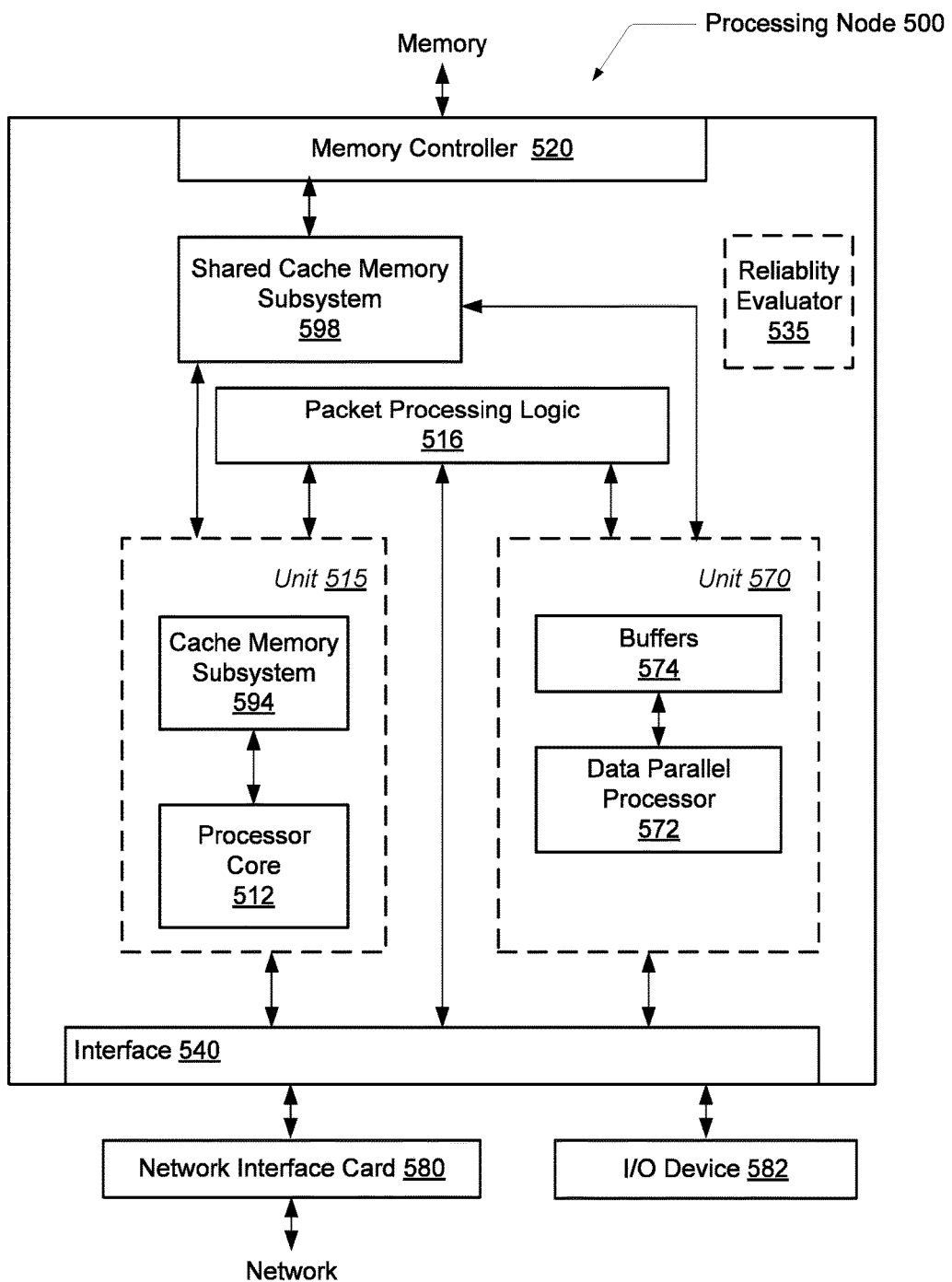
FIG. 5 is a generalized diagram of one embodiment of an exemplary processing node.

Referring to FIG. 5, one embodiment of an exemplary processing node 500 is shown. In some embodiments, the illustrated functionality of processing node 500 is incorporated upon a single integrated circuit. For example, the processing node 500 is a system on a chip (SoC). In some embodiments, the processing node 500 is also used as one or more nodes in a multi-node computing system. In other embodiments, some of the functionality is removed from the processing node 500 so it is used as an embedded processor in an embedded system.

As shown in the illustrated embodiment, the processing node 500 includes one or more processing units 515, each of which includes one or more processor cores 512 and an associated cache memory subsystem 594. In various embodiments, processor core 512 utilizes a general-purpose micro-architecture.

In one embodiment, processor cores 512 include circuitry for executing instructions according to a predefined general-purpose instruction set. For example, the SPARC® instruction set architecture (ISA) is selected. Alternatively, the x86, x86-64®, Alpha®, PowerPC®, MIPS®, PA-RISC®, or any other instruction set architecture is selected. Generally, processor core 512 accesses the cache memory subsystems 594, respectively, for data and instructions. If the requested block is not found in cache memory subsystem 594 or in shared cache memory subsystem 598, then a read request is generated and transmitted to the memory controller 520 within the node to which the missing block is mapped. Cache memory subsystems 594 is integrated within respective processor cores 512. Both the cache memory subsystem 594 and the shared cache memory subsystem 598 includes a cache memory coupled to a corresponding cache controller.

Processing node 500 also includes one or more processing units 570, which includes one or more processor cores 572 and data storage buffers 574. In various embodiments, processor core 572 is not a mirrored silicon image of processor core 512. Rather, processor core 572 has a micro-architecture different from the micro-architecture used by processor core 512. In some embodiments, the processor core 572 includes a micro-architecture that provides high instruction throughput for computationally intensive tasks. In some embodiments, processor core 572 has a parallel architecture. For example, in some embodiment the processor core 572 is a single instruction multiple data (SIMD) based core. Examples of SIMD cores include graphics processing units (GPUs), digital signal processing (DSP) cores, or otherwise. In one embodiment, the processing node 500 includes a single instruction set architecture (ISA).

The threads of software applications are scheduled on one of processor cores 512 and 572 in a manner that each thread has the highest instruction throughput based at least in part on the runtime hardware resources of the processor cores 512 and 572. In some embodiments, processing unit 570 is a graphics processing unit (GPU). Conventional GPUs utilize very wide single instruction multiple data (SIMD) architectures to achieve high throughput in highly data parallel applications. Each object is processed independently of other objects, but the same sequence of operations is used.

In one embodiment, the unit 570 is integrated on the motherboard. In another embodiment, the illustrated functionality of processing node 500 is incorporated upon a single integrated circuit. In such an embodiment, each of unit 515, which is a CPU, and unit 570, which is a GPU, is a proprietary core from different design centers. Also, the GPU 570 is able to directly access both local memories 594 and 598 and main memory via memory controller 120 from the processing node 500, rather than performing memory accesses off-chip via interface 540. This embodiment lowers latency for memory accesses for the GPU 570, which translates into higher performance.

Generally, packet processing logic 516 is configured to respond to control packets received on the links to which processing node 500 is connected, to generate control packets in response to processor cores 512 and 572 and/or cache memory subsystems 594, and to generate probe commands and response packets in response to transactions selected by memory controller 520 for service, and to route packets for which node 500 is an intermediate node to other nodes through interface logic 540. In some embodiments, the packet processing logic 516 is referred to as a crossbar switch.

Interface logic 540 includes logic to receive packets and synchronize packets to an internal clock used by packet processing logic 516. Interface logic 540 also includes logic to communicate with one or more input/output (I/O) devices (582). In some embodiments, the interface logic 540 directly communicates with external devices without utilizing the packet processing logic 516, a crossbar switch or another component. For example, network messages is conveyed directly between each of the unit 515 and the network interface card 580 and similarly between each of the unit 570 and the network interface card 580.

In the embodiment shown, the interface logic 540 includes at least a Universal Serial Bus (USB) interface, a Serial ATA bus interface to storage devices, a PCI Express Peripheral Component Interconnect Express (PCIe) serial expansion bus interface, a low pin count (LPC) bus, a peer-to-peer (P2P) direct memory access (DMA) controller, and so forth. Other embodiments exclude one or more of the foregoing and/or include other devices or technologies.

The processing node 500 is connected to a network interface card (NIC) 580. The NIC 580 includes circuitry and logic for communicating with other processing nodes across a network. For example, the NIC 580 utilizes logic to communicate with a physical layer and a data link layer standard such as Ethernet, Fibre Channel, Wi-Fi or Token Ring. The NIC 580 allows for communication with a group of close by computers on a same local area network (LAN). Additionally, the NIC 580 allows for communication with other nodes across a network. The NIC 580 includes a network protocol stack such as a HTTP protocol for an application layer, a TCP protocol for a transport layer, an IP protocol for an internet layer, an Ethernet protocol for a data link layer, and an IEEE 802.3u protocol for a physical layer.

The processing node 500 also includes a reliability evaluator 535. The reliability evaluator 535 determines an overall reliability level for the processing node 500. The reliability evaluator 535 receives reliability information from one or more of the components within the processing node 500. In some embodiments, the reliability evaluator 535 also receives reliability information from one or more mechanical components of the I/O devices 582.

Further, in some embodiments, the reliability evaluator 535 receives reliability information from other components through the NIC 580. The generated overall reliability level corresponds to a system consisting at least the processing node 500 and other components. The logic and algorithms described earlier for the reliability monitors is included within the reliability evaluator 535. Alternatively, the reliability monitors are included within the processing node 500. The overall reliability level is used by an operating mode manager (not shown) to select operating parameters for one or more of the components within the processing node 500 and components external to the processing node 500.

In various embodiments, the reliability evaluator 535 utilizes operational instructions such as firmware and/or other microcode for generating the overall reliability level. In various embodiments, such operational instructions are stored in a non-volatile memory. The operational instructions are also used for the monitoring of reliability information and translating to reliability values as performed by the algorithms in the reliability monitors. In some embodiments, the algorithms used by the reliability evaluator 535 and the reliability monitors is implemented in hardware. In other embodiments, these algorithms are implemented in firmware or otherwise. In some embodiments, the operational instructions are updated to modify the algorithm.

Figure 6:
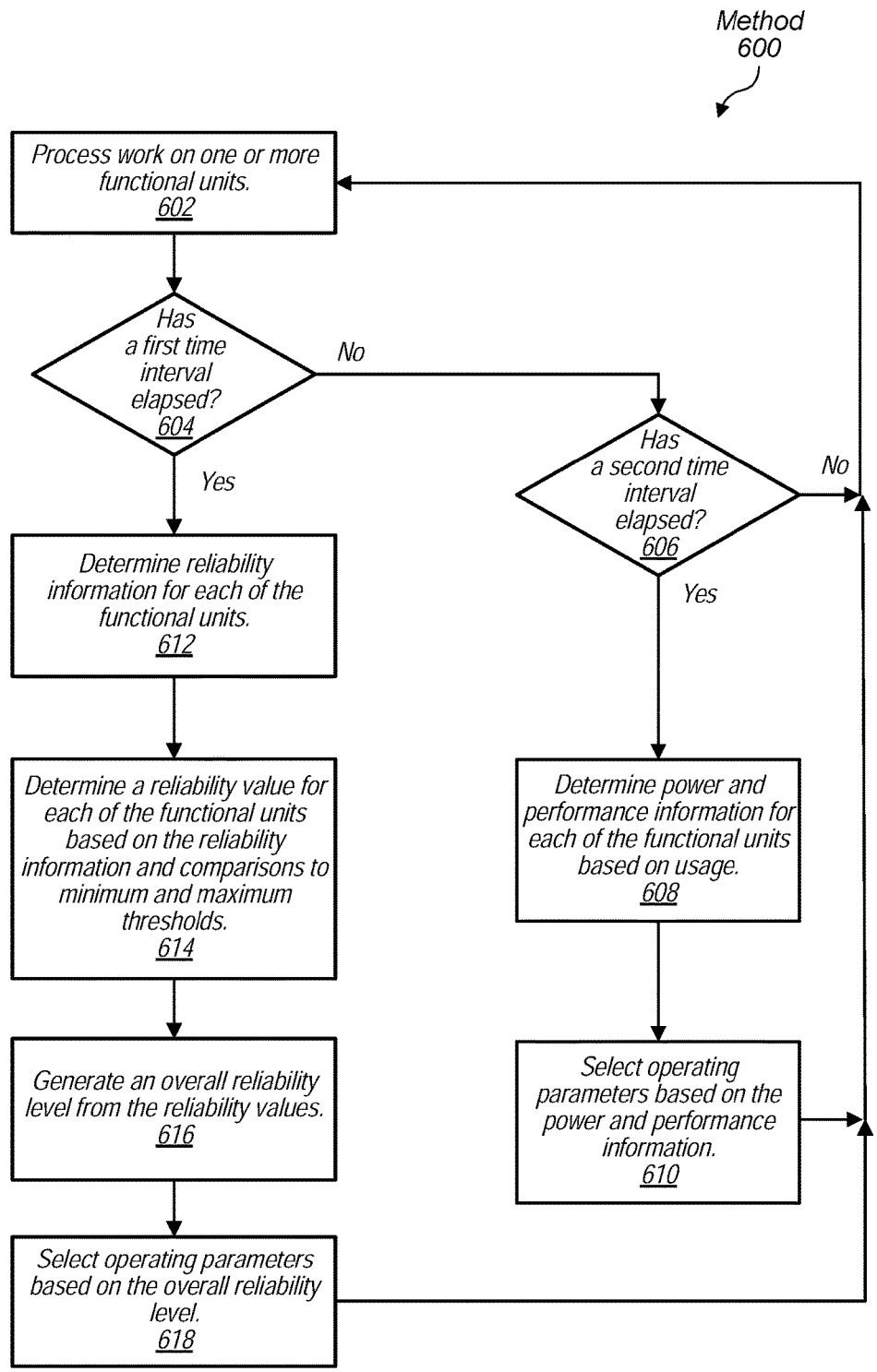
FIG. 6 is a generalized diagram of one embodiment of a method for updating operating parameters of a computing system based on monitored reliability is shown.

Referring now to FIG. 6, one embodiment of a method 600 for updating operating parameters of a computing system based on monitored reliability is shown. A workload consisting of one or more software applications are processed by one or more functional units (block 602). A first time interval is selected to indicate when to update operational parameters of the one or more functional units based on at least monitored reliability information. The update of the operational parameters after the first time interval has elapsed are also based on monitored power and performance information in addition to the monitored reliability information. A second time interval is selected to indicate when to update operational parameters of the one or more functional units based on monitored power and performance information. In various embodiments, the first time interval is greater than the second time interval. For example, in some embodiments, the first time interval is on the order of a few days to a week to a month, whereas the second time interval is on the order of less than a second. In various embodiments, the operation mode manager updates operating parameters every millisecond, whereas a reliability evaluator provides indications for operating parameter updates based on monitored reliability every day or every week. In other embodiments, the first time interval is the same as the second time interval or even less than the second time interval.

For cases when the first time interval is the same as the second time interval, the steps described for blocks 608-610 are performed along with the steps described for blocks 612-618. For other cases when the first time interval is not the same as the second time interval, the steps described for blocks 608-618 are performed separately as in the below discussion. In some embodiments, in addition to the elapse of a given time interval, reporting reliability information and determining updated operating parameters is also performed at other times. For example, the reporting and determining is done responsive to a user command, program code, or the detection of some event.

When the first time interval has not yet elapsed ("no" branch of conditional block 604), but the second time interval has elapsed ("yes" branch of conditional block 606), power and performance information is determined for each of the functional units based on usage (block 608). This information includes a power-performance state for one or more functional units, one or more sensor-measured temperature values, a measured operational current, an activity level measured over time or based on scheduling currently occurring by the operating system, and so on. Operating parameters are selected based on this information (block 610). Afterward, control flow of method 600 returns to block 602.

When the first time interval has elapsed ("yes" branch of conditional block 604), reliability information for each of the functional units is determined (block 612). As described earlier, examples of the reliability information include a number of parity errors, a number of detected error and correction actions for data, one or more temperature values from sensors, a number of dropped packets at an I/O interface, a precision level for numerical results produced by the functional units, a number of times an error code or an exception is used, a number of times a robotic arm fails to perform a procedure on an assembly line, a number of times a throttle is not set correctly to allow for a given engine efficiency to be achieved, a number of times a transmission waits too long or actually does not shift gears when requested, and so forth. Any number of a variety of examples regarding the measured reliability of a system are used.

A reliability value for each of the functional units is determined based on the reliability information and comparisons to minimum and maximum thresholds (block 614). The reliability information is translated to reliability values. For example, a number of parity errors from a given functional unit is compared to thresholds for parity errors in a given time period. Based on at least the comparisons, the number of parity errors is translated to a reliability value which indicates a relatively low, medium or high reliability regarding retrieving data in the given functional unit or I/O interface. In some embodiments, the reliability value is a normalized value. A corresponding reliability value is generated for each piece of the reliability information. In some embodiments, one or more translated reliability values are combined to generate another reliability value to use later for generating a reliability level.

An overall reliability level is generated from the reliability values (block 616). In various embodiments, a weighted sum is used as described earlier to define a relative effect of each of the functional units, I/O interfaces and mechanical components of the system on the overall reliability level. Following, operating parameters are selected based at least in part on the overall reliability level (block 618).

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
a plurality of functional units;
a reliability monitor; and
a reliability evaluator;
wherein the reliability monitor is configured to:
monitor reliability information of a functional unit of the plurality of functional units; and
generate one or more reliability values based at least in part on the reliability information;
wherein the reliability evaluator is configured to:
generate a reliability level for the functional unit based at least in part on the reliability values;
generate an overall reliability level for the plurality of functional units by summing a weighted reliability level for each one of the plurality of functional units; and
update operating parameters of the functional unit to change a reliability of the functional unit, responsive to the generated reliability level.

2. The semiconductor chip as recited in claim 1, wherein the reliability information comprises one or more of a number of system crashes and a number of detected error and correction actions for data.

3. The semiconductor chip as recited in claim 1, wherein the reliability information comprises one or more of a temperature history and feedback from other applications or components.

4. The semiconductor chip as recited in claim 1, wherein in response to determining the generated reliability level is greater than a first threshold, the updated operating parameters include values that reduce the reliability of the functional unit.

5. The semiconductor chip as recited in claim 4, wherein the updated operating parameters include one or more of a lowered operational voltage and parameters indicating lowered precision for compute blocks within the functional unit.

6. The semiconductor chip as recited in claim 4, wherein the updated operating parameters include one or more of parameters that cause one or more compute blocks to be disabled within the functional unit and cause the use of lossy data compression.

7. The semiconductor chip as recited in claim 1, wherein in response to determining the generated reliability level is less than a second threshold, the updated operating parameters include values for the operating parameters that increase reliability for the functional unit from a current reliability for the functional unit.

8. The semiconductor chip as recited in claim 1, wherein the reliability evaluator is configured to generate the reliability level for the functional unit in further response to detecting a given time interval has elapsed.

9. A method comprising:
operating a plurality of functional units;
monitoring reliability information of a functional unit of the plurality of functional units;
generating one or more reliability values based at least in part on the reliability information;
generating a reliability level for the functional unit based at least in part on the reliability values;
generating an overall reliability level for the plurality of functional units by summing a weighted reliability level for each one of the plurality of functional units; and
updating operating parameters of the functional unit to change a reliability of the functional unit, responsive to the generated reliability level.

10. The method as recited in claim 9, wherein in response to determining the generated reliability level is greater than a first threshold, the updated operating parameters include values that reduce the reliability of the functional unit.

11. The method as recited in claim 10, wherein the updated operating parameters include one or more of parameters indicating a speculative communication protocol through decoupling acknowledgment from requests and parameters indicating reducing power to a motor.

12. The method as recited in claim 9, wherein in response to determining the generated reliability level is less than a second threshold, the updated operating parameters include values for the operating parameters that increase reliability for the functional unit from a current reliability for the functional unit.

13. The method as recited in claim 9, further comprising generating the reliability level for the functional unit in further response to detecting a given time interval has elapsed.

14. The method as recited in claim 9, wherein the reliability information comprises one or more of a number of detected radiation level violations and customer feedback.

15. A system comprising:
a plurality of functional units;
operational instructions comprising a method for adapting operating parameters over time;
a reliability monitor; and
a reliability evaluator;
wherein the reliability monitor is configured to:
monitor reliability information of a functional unit of the plurality of functional units; and
generate one or more reliability values based at least in part on the reliability information; and
wherein the reliability evaluator is configured to:
generate a reliability level for the functional unit based at least in part on the reliability values;
generate an overall reliability level for the plurality of functional units by summing a weighted reliability level for each one of the plurality of functional units; and
update operating parameters of the functional unit to change a reliability of the functional unit, responsive to the generated reliability level.

16. The system as recited in claim 15, wherein the operational instructions comprise firmware.

17. The system as recited in claim 15, wherein the operational instructions reside in non-volatile memory and may be updated.

18. The system as recited in claim 15, wherein in response to determining the generated reliability level is greater than a first threshold, the updated operating parameters include values that reduce the reliability of the functional unit.

* * * * *